April 26, 1955     T. H. DOHERTY     2,706,833
INLAY FOR RUBBER ARTICLE AND METHOD OF INLAYING
Filed June 27, 1952
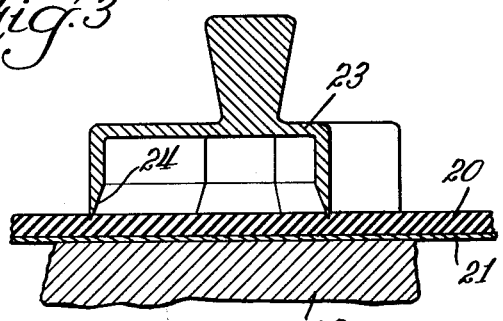
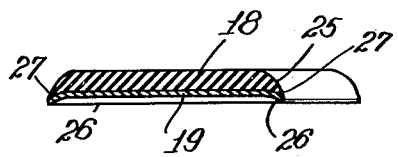
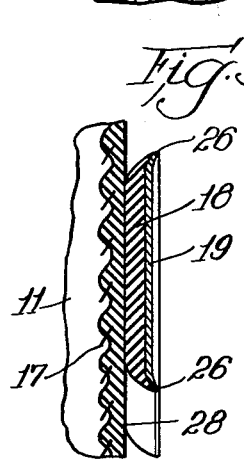
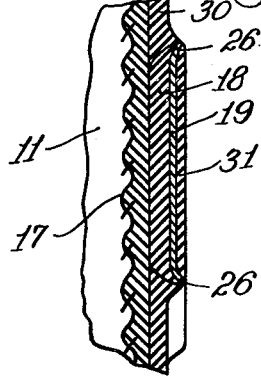
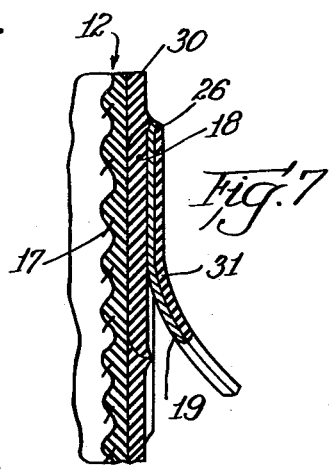
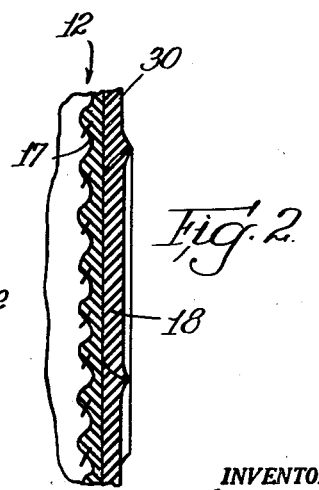
INVENTOR.
Thomas Henry Doherty
BY Eugene M. Giles atty.

United States Patent Office 2,706,833
Patented Apr. 26, 1955

2,706,833

INLAY FOR RUBBER ARTICLE AND METHOD OF INLAYING

Thomas Henry Doherty, South Bend, Ind., assignor to Mishawaka Rubber and Woolen Manufacturing Company, Mishawaka, Ind., a corporation of Indiana Application June 27, 1952, Serial No. 295,937

5 Claims. (Cl. 18—61)

My invention relates to inlays for rubber articles and to a method of inlaying, and has reference more particularly to an inlay and method of inlaying wherein the article to which the inlay is applied is made of a deposit of a liquid dispersion of rubber or the like.

In the manufacture of rubber footwear, rubber gloves, bathing caps and various other rubber articles, it is oftentimes desirable to provide certain areas thereof with inlaid rubber parts of a different color rubber or of a different surface pattern, usually, but not necessarily, for decoration or ornamentation.

Heretofore there has been no convenient and economical way of providing such inlays, it being customary, when such inlays were employed, to provide the inlay receiving layer with a recess of the shape and size of the proposed inlay, usually by cutting out from the layer a piece thereof of the inlay shape and size, and to fit the inlay in the recess in such manner that it will unite at all places therearound with the layer and become an integral part thereof.

Generally such inlays are of irregular shape to provide an attractive design configuration, and the procedure of providing the inlay is so difficult and tedious to assure proper application thereof, that such inlays are rarely used in the manufacture of rubber footwear, rubber gloves, bathing caps and other similar articles of volume production.

Instead, it has been customary where an ornamental pattern or design was desired, to merely superimpose on the layer to be decorated therewith, a thin cut out, from another layer, of the shape and size of the decorative or ornamental feature which it was desired to employ on the rubber article.

The principal objects of my invention are, to simplify and facilitate the making of rubber articles with inlays of any desired shape or size; to provide an improved inlay; and to insure perfect conformity of the surrounding rubber layer to the inlaid piece and union with one another at all places around the inlay; these and other objects being accomplished as explained hereinafter and as shown in the accompanying drawing, in which:

Fig. 1 is a side view of a rubber boot provided with an inlaid star design, in accordance with my invention, and showing the form or last on which the boot is made;

Fig. 2 is a fragmentary sectional view, greatly enlarged, taken on the line 2—2 of Fig. 1;

Fig. 3 is a view showing the step of preparing the inlay piece of Fig. 1 for application to the boot;

Fig. 4 is a sectional view of the inlay piece as produced by the step of Fig. 3;

Fig. 5 is a view showing the manner of application of the inlay piece of Fig. 4 for incorporation in the boot;

Fig. 6 is a view similar to Fig. 5 showing the inlay piece of Fig. 5 after application of the rubber layer in which it is embedded;

Fig. 7 is a view similar to that of Fig. 6, showing the eventual step of exposing the inlay; and Fig. 8 is a fragmentary view similar to that of Fig. 5 showing the corresponding stage of assembly of the boot without a lining.

In the drawing, I have for purposes of illustration, shown my invention in connection with a rubber boot 10, although it is to be understood that the invention is not limited thereto, but may be employed in connection with rubber gloves, bathing caps and various other rubber articles which it is desired to provide with inlays for decoration, ornamentation or other purposes.

This boot 10 is of conventional type and made on a last 11 in the customary manner of making rubber footwear, the wall 12 thereof being made of a suitable liquid compound of rubber or the like, deposited and solidified on the last 11, in well known manner, usually by repeatedly dipping the last in a liquid rubber latex dispersion and coagulating the latex dispersion thereon until a layer of the desired thickness is produced, after which other rubber parts, such for example as the sole 13, heel 14, boxing 15, and upper edge bead 16, usually of milled rubber stock, are secured thereon to complete the boot assembly. The illustrated boot is shown with a fabric lining 17, although it may be made with or without the lining as preferred.

This boot 10 has a decorative or ornamental inlay 18 embedded in the wall 12 thereof, which, instead of being applied in the usual manner of inlaying, is embedded in the wall by first placing the inlay piece 18 in position at the desired place of incorporation in the wall 12 and then building up the wall by dipping the last in the liquid rubber compound, so that the compound accumulates on the last and around the inlay piece to the desired depth or wall thickness.

Thus the liquid rubber compound conforms exactly to and solidifies in intimate connection with the periphery of the inlay piece 18 at all places therearound so that when the boot is vulcanized the rubber of the wall combines with the rubber of the inlay piece around the periphery thereof and the inlay piece 18 becomes a continuous integral part of the boot wall 12.

In the dipping operation to produce the wall 12 the rubber liquid accumulates on and extends over the inlay piece 18, and it is necessary to remove this accumulated overlying deposit to expose the inlay 18 in the finished boot.

Moreover it is important that such overlying deposit separate readily from the portion of the wall 12 around the inlay 18, and along a clearly defined line of division coincident with the surrounding outer edge of the inlay piece 18.

To insure such ready removal of the accumulated deposit from the outer face of the inlay 18 and clear cut separation thereof from the surrounding portion of the boot wall along a line coincident with the outer edge of the inlay piece 18, I prefer to prepare the inlay piece 18 with a covering 19 of aluminum foil on the outer face thereof in the following manner:

The inlay piece is preferably made of milled rubber compound which is calendered in a sheet, such as indicated at 20 in Fig. 3, of the proper thickness so that when the inlay 18, made therefrom, is embedded in the boot wall 12 the outer face of the inlay piece 18 will be at the same or substantially the same surface level as the outer face of the boot wall 12. This sheet 20 is preferably made of rubber of a different color than that of the boot wall 12 so that the inlay piece will contrast conspicuously therewith.

A sheet 21 of aluminum foil is laminated to the sheet 20 on the side thereof which corresponds to the outer face of the inlays 18 to be made therefrom, such lamination being readily accomplished as the natural tack of the rubber of the sheet 20 provides a sufficiently strong bond for the purpose of the invention.

This aluminum foil sheet 21 may be plain, or may be embossed with an overall design, such as a fine grain, or the like, which will be impressed on the surface of the inlay. If such embossing is employed, it is preferred to leave the aluminum foil on the inlay during the cure.

After the sheet 20 is prepared with the sheet 21 of aluminum foil laminated thereon, the composite sheet 20, 21 is laid on a cutting table or bed 22 with the aluminum foil 21 at the underside, and the inlay piece 18 and cover layer 19 is cut therefrom with a die 23 in the manner illustrated in Fig. 3.

The die 23, which is of the same peripheral shape as the inlay 18, has the cutting edge thereof beveled at the inner side, as indicated at 24, and the table or bed 22 is preferably of wood or rubber, so that the die cuts clear through the composite layer 20, 21, and provides the rubber inlay piece 18 with a beveled or rounded peripheral edge 25, and the aluminum foil layer or covering 19 with a slightly outturned edge as shown at 26 having a feather edge 27 of the rubber piece 18 conformed thereto on the underside.

This composite cut out 18, 19 is then placed in position on the last 11, at the proper location for embedding in the boot wall 12, with the aluminum foil layer 19 thereof at the outer side, as indicated in Fig. 5, but preferably is not applied directly to the last but instead to an already applied layer on the last.

Accordingly, if the boot is made with a fabric lining, as indicated at 17 herein, the lining 17 is first applied on the last, in the usual manner of constructing lined rubber footwear. Such linings 17 of dipped footwear are usually made of fabric which has a coating of rubber on the outer side, as indicated at 28 in Fig. 5, and the inlay piece 18 with aluminum foil 19 on the outer side is secured to the gum coated outer face 27 of the already applied lining 17, as indicated in Fig. 5.

If no lining 17 is employed for the boot 10, the last 11 is single dipped in the liquid rubber latex dispersion to produce an initial film 29 of rubber thereon (see Fig. 8), which is coagulated in the usual manner, and the inlay piece 18 with aluminum foil 19 on the outer side is secured to this initial film 28, as shown in Fig. 8. Preferably the last is dipped in an anti-adhesive, such as a slip finish composition or bentonite clay slurry before this initial dipping, to facilitate the eventual stripping of the overshoe from the last.

To insure adequate adhesion of the inlay piece 18 to the rubber surface 27 or 28, a solvent may be used to freshen the surface, or if desired, a rubber cement may be employed.

After the composite inlay piece 18 and aluminum foil covering 19 has been applied, as above explained and as shown in Figs. 5 or 8, the last is dipped a number of times in the bath of liquid rubber latex, until the desired thickness of boot wall 12 is built up, as indicated at 30, after which any required parts, such as the sole 13, heel 14, foxing 15 and beading 16 are adhesively secured at the proper places on the boot wall 12 and the boot is then vulcanized in the usual manner, on the last 11, which is removed after such vulcanization.

Any conventional liquid compound may be employed for making the boot wall 12 and it is applied in the usual manner by dipping the last successively in the compound, and in a coagulant, such as acetic acid coagulant, and in a water bath.

In such dipping operations for producing the wall 12, a layer of the compound accumulates and is solidified on the aluminum foil covering 19 of the inlay 18, as indicated at 31 in Fig. 6, and this accumulated layer 31 must be removed together with the aluminum foil layer 19, to expose the inlay 18 in the finished boot.

It is an important feature of the present invention that by reason of the aluminum foil layer 19 and the edge formation thereof, such removal of the overlying layer 31 and aluminum foil layer 19 is readily accomplished and that said layer 31 readily separates from the surrounding wall 12 along a line coincident with the edge of the inlay 18.

This is due, not only to the characteristic of aluminum foil, that its adhesion to the inlay piece 18 is such that it may be stripped therefrom quite readily, but moreover that the dipping compound does not deposit very thickly on the outturned edge 26 of the foil and furtherance as synaeresis takes place in the solidification of the deposited compound, the deposit shrinks and the sharp edge of the aluminum foil covering 19 cuts into the deposited film sufficiently so that the portion 31 of the compound which accumulates and solidifies on the aluminum foil 19, separates quite readily from the portion of the wall 12 therearound and along a line which is defined and determined by the outturned edge of the foil layer 19.

The foil layer 19 and deposit 31 thereon may be stripped from the applied inlay 18 either before or after vulcanization of the boot, and when stripped therefrom leaves the inlay exposed and sharply outlined in the shape orignally imparted thereto by the die 23.

Inlays of any desired size and shape may be produced in the manner explained above, and in bathing caps, rubber gloves and the like, which are made entirely from latex, precured latex may be employed, in which event no subsequent cure of the article made therefrom is required. Moreover, in some cases the inlaying may be performed by spraying the liquid compound to produce the wall in which the inlay is embedded, instead of by dipping.

Accordingly, it is to be understood that while I have shown and described my invention in a preferred form, I am aware and contemplate that various changes and modifications may be made therein without departing from the principles of the invention, the scope of which is to be determined by the appended claims.

What I claim is:

1. The method of making a rubber article with a wall having a rubber inlay with the outer face thereof exposed, which said method comprises providing a backing on which the wall is to be made, applying on said backing at the place where the inlay is to be located in the wall a piece of rubber of the desired inlay shape with a readily removable covering on the outer face thereof, then while said covering is retained on the outer face of said piece of rubber, applying and solidifying a liquid rubber compound on said covering and on the backing around said piece of rubber and at the same time forming the thus applied compound with a line of ready separation extending peripherally around the piece of rubber between said compound on the covering and said compound on the backing, and thereafter stripping said covering and the solidified compound thereon from the piece of rubber and separating the compound on the covering along said line from said compound on the backing.

2. The method of making a rubber article with a wall having a rubber inlay with the outer face thereof exposed, which said method comprises providing a backing on which the wall is to be made, applying on said backing at the place where the inlay is to be located in the wall a piece of rubber of the desired inlay shape with a readily removable covering on the outer face thereof, then while said covering is retained on the outer face of said piece of rubber, applying and solidifying a liquid rubber compound on said covering and on the backing around said piece of rubber and at the same time at least partially separating the compound on the covering from said compound on the backing along a line extending around the piece of rubber along the periphery thereof and thereafter stripping said covering and the solidified compound thereon from the piece of rubber and completely separating the compound on the covering along said line from said compound on the backing.

3. The method of making a rubber article with a wall having a rubber inlay with the outer face thereof exposed, which said method comprises providing a backing on which the wall is to be made, applying on said backing at the place where the inlay is to be located in the wall a piece of rubber of the desired inlay shape with a readily removable covering on the outer face thereof, then while said covering is retained on the outer face of said piece of rubber, applying and solidifying a liquid rubber compound on said covering and on the backing around said piece of rubber and at the same time indenting the underside of the applied compound from the underside thereof along a line extending along the periphery of the piece of rubber between said compound on the covering and said compound on the backing, and thereafter stripping said covering and the solidified compound thereon from said piece of rubber and completely separating the compound on the covering along said line from said compound on the backing.

4. The method of making a rubber article with a wall having a rubber inlay with the outer face thereof exposed, which said method comprises providing a backing on which the wall is to be made, applying on said backing at the place where the inlay is to be located in the wall a piece of rubber of the desired inlay shape with a readily removable covering on the outer face thereof, and having the edge thereof outturned and extending along the periphery of said piece of rubber, then while said covering is retained on the outer face of said piece of rubber, applying and solidifying a liquid rubber compound conjointly on said covering and on the backing around said piece of rubber with the compound on the covering at least partially separated by said outturned edge from said compound on the backing, and thereafter stripping said covering and the solidified compound thereon from the piece of rubber.

5. The method of making a rubber article with a wall having a rubber inlay with the outer face thereof exposed, which said method comprises providing a backing on which the wall is to be made, laminating metal foil on sheet rubber and cutting therefrom a combined rubber and foil piece of the desired inlay shape with the metal foil having a sharp outturned edge therearound, applying the combined rubber and foil piece on the backing at the place where the inlay is to be located in the wall and with the metal foil at the outer side thereof and the outturned sharp edge projecting outwardly therefrom, then applying and solidifying a liquid rubber compound on the outer face of said metal foil and on the backing around the rubber portion of the combined rubber and foil piece with the compound on the foil at least partially separated by said sharp outturned edge of the foil from said compound on the backing, and thereafter stripping said foil and the solidified compound thereon from the rubber portion of said combined rubber and foil piece.

References Cited in the file of this patent

UNITED STATES PATENTS

| | | |
|---|---|---|
| Re. 19,549 | Byck | Apr. 30, 1935 |
| 1,552,907 | Binmore | Sept. 8, 1925 |
| 2,152,725 | Auzin | Apr. 4, 1939 |
| 2,523,234 | Rado | Sept. 19, 1950 |